(12) United States Patent
Aster et al.

(10) Patent No.: US 8,255,737 B1
(45) Date of Patent: Aug. 28, 2012

(54) SYSTEM AND METHOD FOR A REDUNDANT COMMUNICATION FABRIC IN A NETWORK STORAGE SYSTEM

(75) Inventors: Radek Aster, Sunnyvale, CA (US);
Steven C. Miller, Sunnyvale, CA (US);
Kurtis A. Chan, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 177 days.

(21) Appl. No.: 12/770,241

(22) Filed: Apr. 29, 2010

(51) Int. Cl.
*G06F 11/00* (2006.01)

(52) U.S. Cl. ............ 714/5.1; 714/6.1; 714/6.2; 714/42; 714/43; 710/2; 710/300

(58) Field of Classification Search .................. 714/5.1, 714/6.1, 6.2, 6.21, 6.22, 6.3, 42, 43; 710/2, 710/300; 711/111, 112, 114
See application file for complete search history.

(56) References Cited

U.S. PATENT DOCUMENTS

| | | | | |
|---|---|---|---|---|
| 6,701,410 B2 * | 3/2004 | Matsunami et al. | .......... | 711/114 |
| 6,795,934 B2 * | 9/2004 | Nagata et al. | .................. | 714/5.1 |
| 7,047,450 B2 * | 5/2006 | Iwamitsu et al. | ................ | 714/43 |
| 7,302,539 B2 * | 11/2007 | Korgaonkar et al. | .......... | 714/5.1 |
| 7,373,546 B2 * | 5/2008 | Nguyen et al. | ................ | 714/5.11 |
| 7,447,121 B2 * | 11/2008 | Kano et al. | ....................... | 714/6.2 |
| 7,472,211 B2 * | 12/2008 | Kawai et al. | ..................... | 714/42 |
| 2004/0139278 A1 * | 7/2004 | Uchiyama et al. | ............. | 711/114 |
| 2006/0253676 A1 * | 11/2006 | Tanaka et al. | .................. | 711/112 |
| 2009/0083484 A1 * | 3/2009 | Basham et al. | ................ | 711/114 |
| 2009/0222623 A1 * | 9/2009 | Nakamura et al. | ............ | 711/114 |

* cited by examiner

*Primary Examiner* — Scott Baderman
*Assistant Examiner* — Joseph D Manoskey
(74) *Attorney, Agent, or Firm* — Perkins Coie LLP (57) ABSTRACT

The techniques introduced here include storage systems including a storage controller configured to access data and a storage subsystem including a storage device having n ports, where n is an integer greater than one, and where the storage device is configured to store the data and to make the data available to the storage controller via each of the n ports. The storage systems also include a communication fabric configured to couple the storage controller to each of the n ports of the storage device via m paths, where m is an integer greater than n, so that the storage system is configured to tolerate failure in up to m−1 paths through the communication fabric, such that the data in the storage device remains accessible to the storage controller even in the presence of failure in up to m−1 paths of the m paths.

14 Claims, 8 Drawing Sheets

SYSTEM AND METHOD FOR A REDUNDANT COMMUNICATION FABRIC IN A NETWORK STORAGE SYSTEM

FIELD OF THE INVENTION

At least one embodiment of the present invention relates generally to network storage systems and, more specifically, to a system and method for a redundant communication fabric in a network storage system.

BACKGROUND

A storage controller can be used as a storage server to store, manage, and retrieve data from storage devices on behalf of one or more clients on a network. The storage devices can include, for example, magnetic or optical storage-based disks or tapes, or solid state devices. Some storage controllers are designed to service file-level requests from clients, as is commonly the case with file servers used in a network attached storage (NAS) environment. Other storage controllers are designed to service block-level requests from clients, as with storage controllers used in a storage area network (SAN) environment. Still other storage controllers are capable of servicing both file-level requests and block-level requests, as is the case with certain storage controllers made by NetApp, Inc. of Sunnyvale, Calif.

A group of storage devices (e.g., disks) and one or more storage controllers assembled in a rack, or other similar enclosure, are conventionally interconnected for communication via a communication fabric. Such an assemblage can be referred to as a storage system. One purpose of the communication fabric in the storage system is to provide fast and reliable communication between the storage controller and storage devices. For modularity, the storage devices are often built into separate enclosures in the rack called "shelves." Each shelf essentially contains only storage devices and little or no electronic "intelligence."

Conventional communication fabrics used within racks are implemented with, for example, Fibre Channel technology. Fibre Channel communication fabric topologies describe how a number of ports of the storage controllers and storage devices are connected together. A "port" in Fibre Channel terminology is any entity that actively communicates over the Fibre Channel communication fabric. Topologies include point-to-point, in which only two devices are connected; arbitrated loop (e.g., Fibre Channel Arbitrated Loop, or "FCAL"), in which all devices are in a logical loop or ring, utilizing Fibre Channel Arbitrated Loop switches; and switched fabric, in which all devices or loops of devices are connected to Fibre Channel Fabric switches. Fibre Channel Arbitrated Loop switches have limited scalability. Fibre Channel Fabric switches are designed for long distance data center communication, and are therefore typically expensive. As such, Fibre Channel technology has certain drawbacks.

At least partially in response to the costs and complexities of Fibre Channel technologies and related storage technologies, various simpler and lower-cost technologies have more recently begun to be used. For example, direct-attach storage devices, including Serial-Attached ATA ("SATA") and Serial-Attached SCSI ("Small Computer System Interface") devices, or "SAS" devices, have begun to be used in storage systems. Direct-attach storage devices are designed to be directly attached to storage controllers without the use of intervening network fabrics or fabric protocols. In the case of SAS storage devices, expanders are typically interposed between SAS storage devices and a storage controller to allow for expanded connectivity (thus the term "expander"). Typically, the interconnect topologies used with expanders between SAS storage devices and storage controllers consist of either a single expander (one storage controller port and multiple disk drives directly attached to the expander), or multiple expanders cascaded to form a simple string of disk drives. In either case, the conventional use of expanders is limited to providing very basic interconnect topologies.

SUMMARY

The techniques introduced here include a storage system including a storage controller configured to access data and a storage subsystem including a storage device having n ports, where n is an integer greater than one, and where the storage device is configured to store the data and to make the data available to the storage controller via each of the n ports. The storage system also includes a communication fabric configured to couple the storage controller to each of the n ports of the storage device via m paths, where m is an integer greater than n, so that the storage system is configured to tolerate failure in up to m−1 paths through the communication fabric, such that the data in the storage device remains accessible to the storage controller even in the presence of failure in up to m−1 paths of the m paths.

Further, the techniques introduced here also include mechanisms for a communication fabric coupling a storage controller to storage devices in one or more storage subsystems, where each storage device is afforded a level of redundancy greater than what its number of ports would otherwise allow. The communication fabric also supports the use of a large number of storage devices in multiple storage subsystems that are isolated from each other for routing purposes. This communication fabric is therefore not limited to very basic topologies such as those possible using conventional direct-attach storage techniques, but avoids the complexity and high cost associated with, for example, Fibre Channel techniques.

This Summary is provided to introduce a selection of concepts in a simplified form that are further described in the Detailed Description and drawings. This Summary is not intended to identify essential features of the claimed subject matter or to limit the scope of the claimed subject matter.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

A method and system for a redundant communication fabric for a storage system, and more specifically for a storage system communication fabric exhibiting redundancy and using direct-attach storage devices is described. Note that references in this specification to "an embodiment," "one embodiment," or the like mean that the particular feature, structure, or characteristic being described is included in at least one embodiment of the present invention. Occurrences of such phrases in this specification do not necessarily all refer to the same embodiment.

Figure 1:
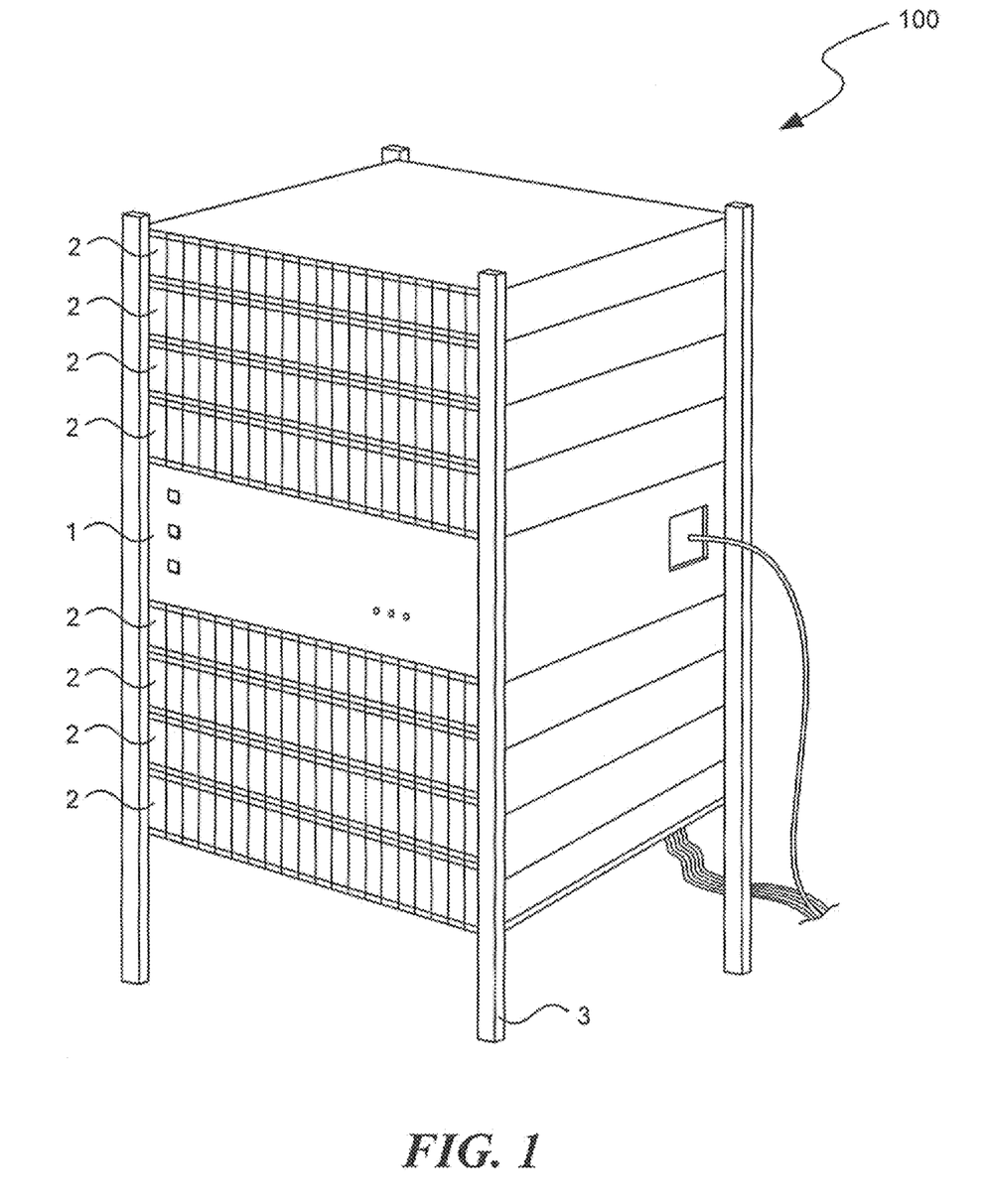
FIG. 1 is an illustration of a storage system according to one embodiment.

FIG. 1 depicts storage system 100, which can include a communication fabric exhibiting redundancy and using direct-attach storage devices, according to the techniques introduced here. In storage system 100, storage controller 1 is connected by cables to multiple disk shelves 2 mounted in rack 3. Each disk shelf can include multiple disks. The cables, which can be internal or external to rack 3, are a portion of the communication fabric. Storage controller 1 enables access to stored data by one or more client computers (not shown) that are connected to storage controller 1 by external cables. Storage system 100 is merely illustrative of a storage system according to the present technique, and as such, other storage systems according to the present technique can be created in varying physical configurations.

Figure 2:
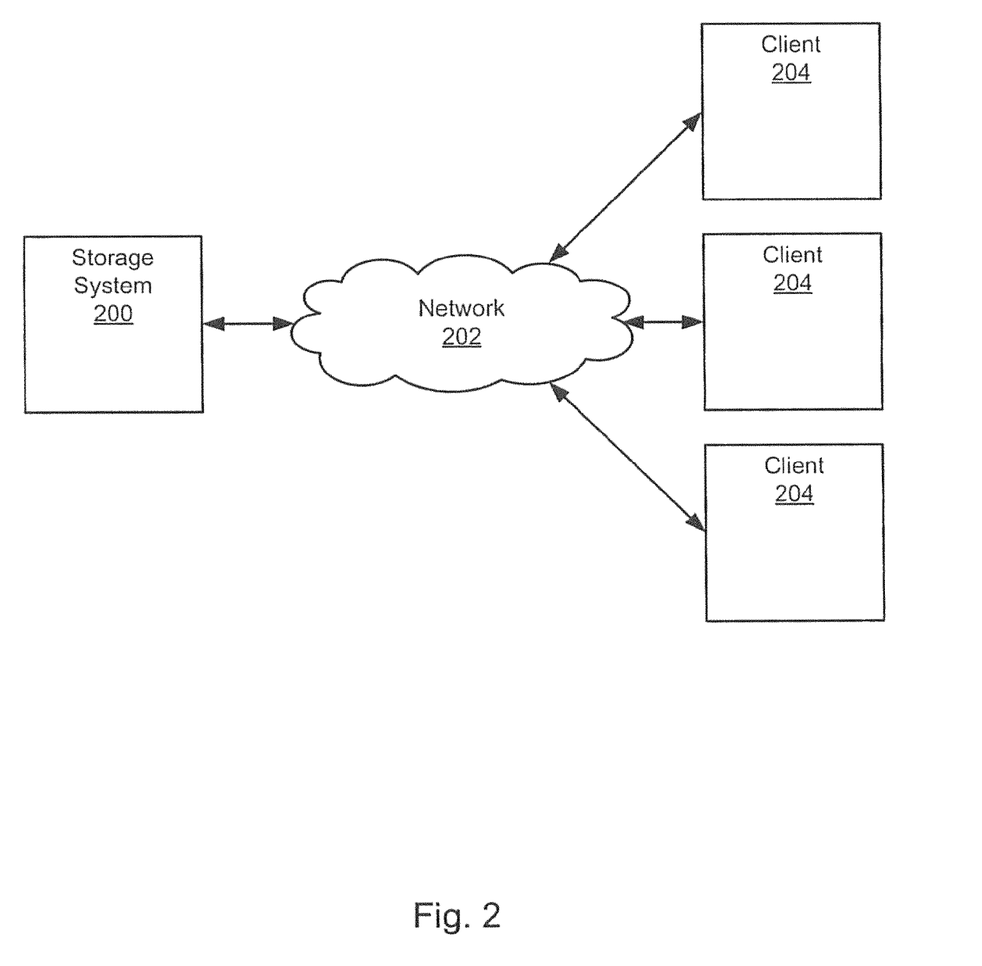
FIG. 2 is a block diagram of storage system coupled to several clients across a network.

FIG. 2 depicts storage system 200 coupled to multiple clients 204 across network 202. Storage system 200 may correspond, in one embodiment, to storage system 100 depicted in FIG. 1 Network 202 can be, in various embodiments, the Internet, a private corporate network, a storage area network ("SAN"), a local area network ("LAN"), a wide area network ("WAN"), or another type of communication network. In another embodiment, storage system 200 can be a network-attached storage ("NAS") system. During operation, clients 204 can transmit commands to storage system 200 to read or write data, and the storage controllers and storage devices of storage system 200 operate to respond to the commands. In some embodiments storage system 200 can also perform other storage related tasks.

Figure 3:
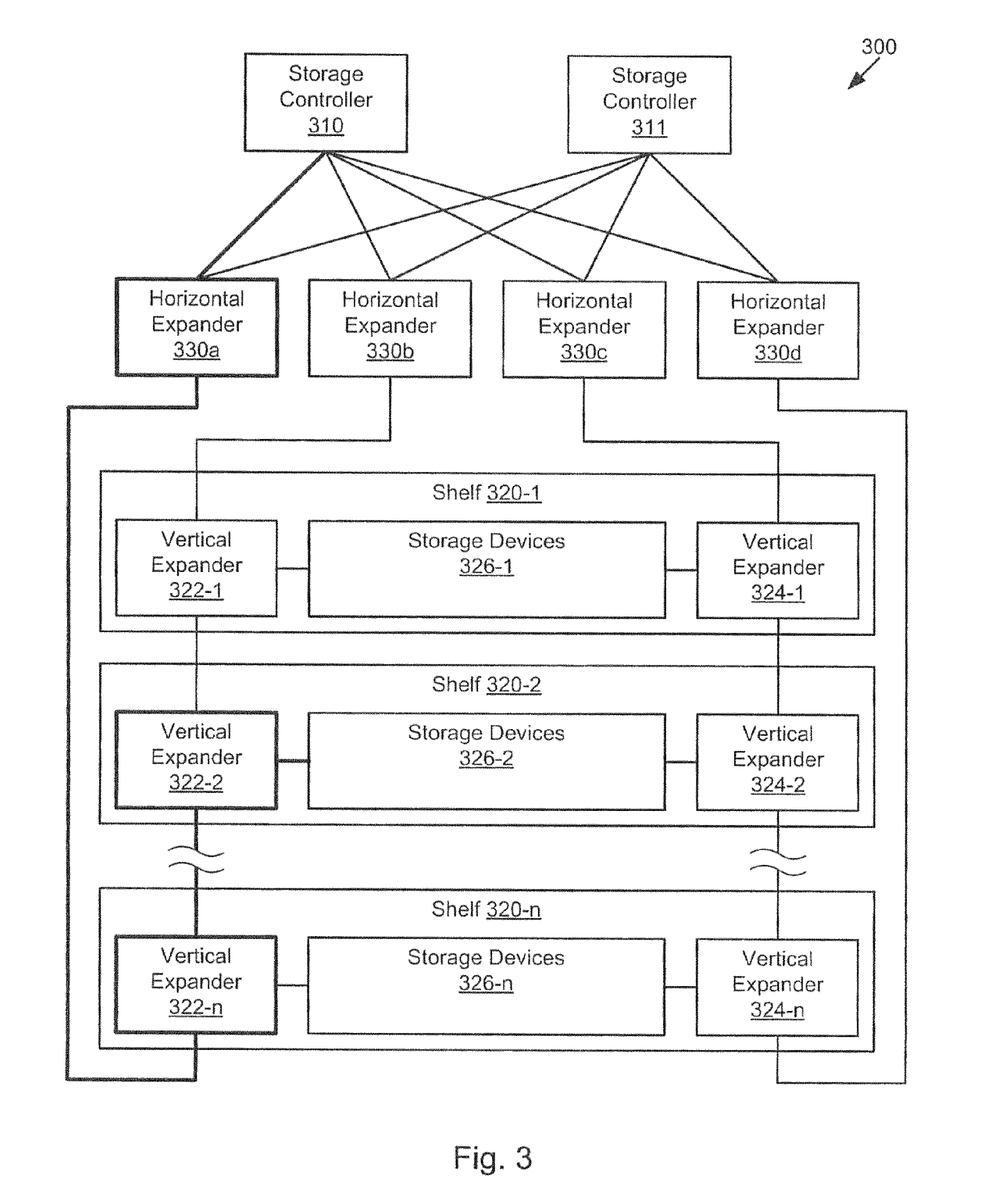
FIG. 3 is a block diagram of a storage system including a group of storage controllers and a storage subsystem that includes a group of shelves of storage devices.

FIG. 3 is a block diagram of storage system 300 in which the techniques introduced here are implemented. Storage system 300 may correspond, in one embodiment, to storage system 200 depicted in FIG. 2. Storage system 300 includes storage controller 310, storage controller 311, and a group of n shelves 320, of which three shelves are depicted in FIG. 3. The group of n shelves 320 is also referred to as a "stack," or a "storage subsystem." Although three shelves are depicted, and n shelves are considered in the discussion below, the techniques introduced here can be implemented with as few as one shelf, such as shelf 320-1. Storage system 300 also includes horizontal expanders 330a, 330b, 330c, and 330d that are coupled between storage controllers 310 and 311 and shelves 320-1 through 320-n as depicted in FIG. 3.

The horizontal expanders introduced above, and vertical expanders that are introduced below, are all direct-attach storage expanders. Note that descriptions here of an expander being a "horizontal" or "vertical" expander do not imply physical orientation. Each horizontal or vertical expander is, in one embodiment, a Serial-Attached SCSI ("Small Computer System Interface") expander, or "SAS" expander. Direct-attach storage expanders are conventionally interposed between a direct-attach storage device and a storage controller to allow for certain simple interconnect topologies.

Typically, direct-attach storage expanders operate as routers for routing frames amongst topology endpoints. However, the communication fabric introduced here can be implemented only with horizontal and vertical expanders configured according to the techniques introduced here.

Shelf 320-1, at the "top" of the stack of n shelves 320, is depicted in FIG. 3 as including a pair of vertical expanders 322-1 and 324-1, as well as a group of storage devices 326-1. Note that descriptions here of a shelf being at the "top" or "bottom" of a stack do not imply physical positioning, but are merely used as guides for understanding the drawings. Vertical expanders 322-1 and 324-1 are coupled to horizontal expanders 330b and 330c, respectively. At the "bottom" of the stack of n shelves 320, shelf 320-n includes a pair of vertical expanders 322-n and 324-n, as well as a group of storage devices 326-n. Vertical expanders 322-n and 324-n are coupled to horizontal expanders 330a and 330d, respectively. As such, only the top and bottom shelves, i.e. shelves 320-1 and 320-n, are coupled to the horizontal expanders of storage system 300. In contrast, the intermediate shelves, such as shelf 320-2, are coupled instead to adjacent shelves. For example, vertical expanders 322-2 and 324-2 are coupled to vertical expanders 322-1 and 324-1, respectively, and to the vertical expanders of the next lowest shelf (not shown). Configured as such, the stack of n shelves 320 are "daisy-chained" together.

Each of the couplings referred to above is, for example, a physical cable link, a passive backplane link, or another suitable communication link. Generally, a link is a facility for communication having a physical attribute, such as a speed or a distance. A path through the communication fabric of storage system 300 includes a group of couplings (e.g., links) and expanders between either of storage controllers 310 or 311 and one of storage devices 326. For example, a path between storage controller 310 and storage devices 326-2 includes horizontal expander 330a, vertical expander 322-n, one or more vertical expanders in the stack of n shelves 320 between vertical expanders 322-n and 322-2, vertical expander 322-2, and all intermediate couplings between the listed expanders. Such a path is illustrated in FIG. 3 with bold lines. Another path between storage controller 310 and storage devices 326-2 includes horizontal expander 330c, vertical expander 324-1, vertical expander 324-2, and all intermediate couplings between the listed expanders. There are multiple paths between any given set of endpoints in storage system 300. By having multiple paths between each storage controller and storage device, the communication fabric of storage system 300 achieves redundancy. Details of this redundancy will be discussed further below.

Figure 4A:
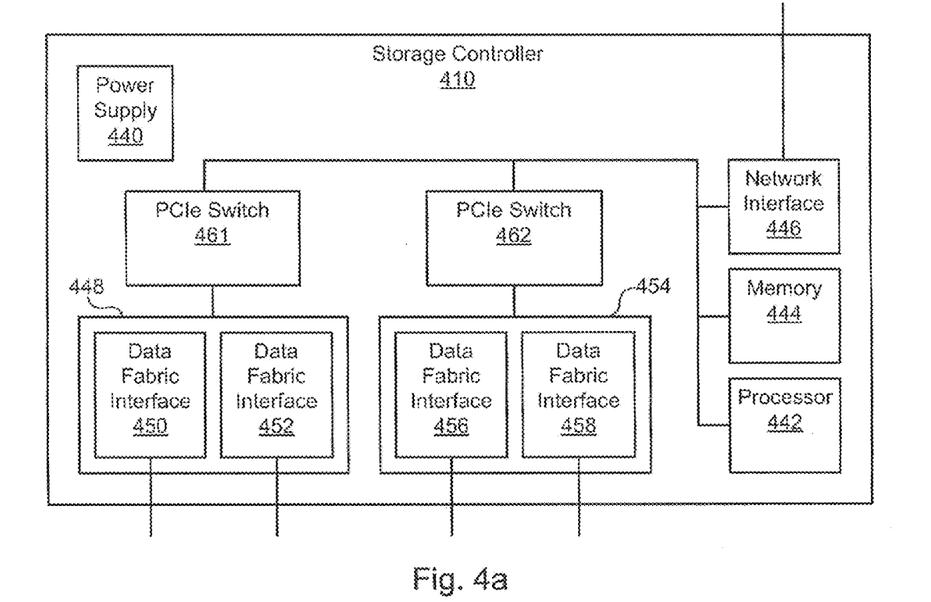
FIGS. 4a and 4b are block diagrams of a storage controller and a shelf of storage devices, respectively.
Figure 4B:
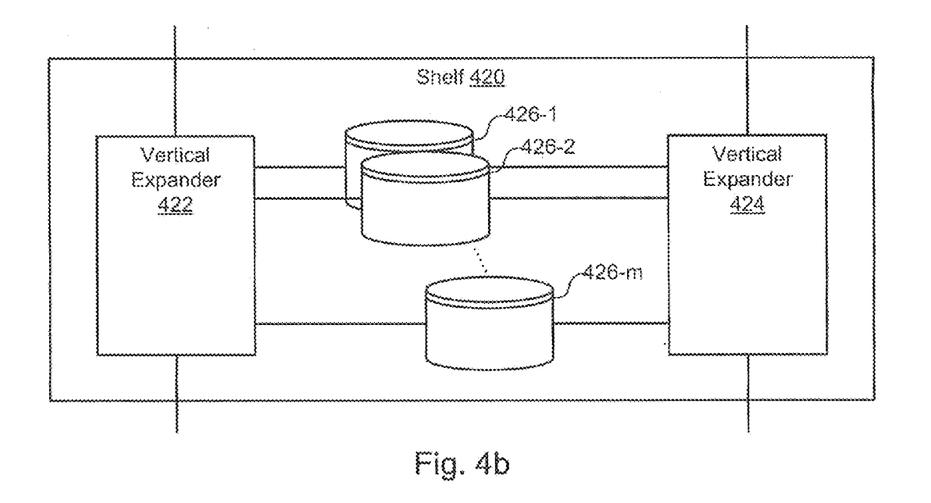

Having thus described storage system 300 depicted in FIG. 3, discussion turns now to the detailed views of storage controller 410 depicted in FIG. 4a and shelf 420 depicted in FIG. 4b. Storage controller 410 corresponds to either of storage controllers 310 and 311 of FIG. 3 and illustrates greater detail. Similarly, shelf 420 corresponds to any of shelves 320-1 through 320-n of FIG. 3 and illustrates greater detail.

FIG. 4a depicts storage controller 410, which includes processor 442 and memory 444 coupled to PCIe switches 461 and 462. Processor 442 may be configured to execute instructions, stored in memory 444, for operating storage controller 410 according to the techniques introduced here. In another embodiment, processor 442 may be configured instead as specially designed hardware, such as an application-specific integrated circuit. Processor 442 can affect operation by sending commands and data via PCIe switches 461 and 462, which can be, for example, components of a PCI-e system. In another embodiment, PCIe switches 461 and 462 can be replaced by, for example, a shared conductor bus, a backplane, or another kind of communication medium. Power for processor 442 and other components is provided by power supply 440. Storage controller 410 also includes network interface 446 coupled to processor 442 and memory 444. Network interface 446, which can be implemented as, for example, an Ethernet interface, is configured to communicate with a network, such as network 202 depicted in FIG. 2, and thus to clients of a storage system, such as clients 204. Further, storage controller 410 includes communication fabric interfaces 450, 452, 456, and 458 for communicating with a set of horizontal expanders, such as horizontal expanders 330a, 330b, 330c, and 330d depicted in FIG. 3.

Communication fabric interfaces 450, 452, 456, and 458 of storage controller 410 are, in one embodiment, implemented on two physically separate host bus adaptors ("HBAs"). These are depicted in FIG. 4a as HBA 448 and HBA 454. By utilizing two HBAs, storage controller 410 achieves redundancy, because if HBA 448 fails, for example, the operation of communication fabric interfaces 456 and 458 on HBA 454 should not be affected. Further, storage controller 410 achieves redundancy by having two or more PCIe switches, because if one fails, another can continue operation. In some embodiments, additional HBAs each including additional communication fabric interfaces and each coupled to PCIe switch 461, PCIe switch 462, or an additional PCIe switch can be included. Further still, in one embodiment storage controller 410 achieves redundancy by having a multiple processor complex coupled to PCIe switches 461 and 462. In such an embodiment, processor 442 and memory 444 represent two or more independent processor and memory sets; i.e. a multiple processor complex. In one embodiment, each of communication fabric interfaces 450 through 458 is a direct-attach storage interface. In particular, communication fabric interfaces 450 through 458 can be implemented as Serial-Attached SCSI ("SAS") interfaces. In such an embodiment, storage controller 410 is regarded as a SAS initiator.

FIG. 4b depicts shelf 420, which includes vertical expanders 422 and 424, as well as m storage devices 426-1 through 426-m. Although three storage devices are depicted, and m storage devices are considered in this discussion, the techniques introduced here can be implemented with as few as one storage device in a given shelf. In one embodiment, shelf 420 includes a passive backplane configured to accept vertical expanders 422 and 424 as well as m storage devices. In another embodiment, shelf 420 also includes a power supply or several redundant power supplies, cooling equipment, and diagnostic or monitoring equipment (not shown). In one illustrative embodiment, vertical expanders 422 and 424 are SAS expanders. SAS expanders have a group of ports for connecting to SAS initiators, SAS targets, or another SAS expander. The shelf-to-shelf connections from vertical expanders 422 and 424 to adjacent shelves can be "wide port" connections utilizing four physical links. In other embodiments, wide port connections can utilize a different number of physical links, such as two, six, or eight, for example. The connections to each of storage devices 426-1 through 426-m can be standard connections (i.e., not wide connections) utilizing one physical link. In another embodiment, a standard connection can utilize a different number of physical links, such as two physical links.

Each of storage devices 426-1 through 426-m is in one embodiment a hard drive, e.g. a magnetic-storage hard disk drive. In other embodiments, storage devices 426-1 through 426-m can be, for example, other forms of magnetic or optical mass data storage, or can be flash memory or another form of nonvolatile solid-state memory. In one illustrative embodiment, storage devices 426-1 through 426-m are "dual-ported" SAS drives. Dual-ported SAS drives have a pair of ports for connecting to a SAS initiator or a SAS expander. By having the pair of ports, a SAS drive achieves a level of redundancy, such that if one port fails, or if a path coupled to one port fails, the other port is able to continue operation. As depicted in FIG. 4b, each of storage devices 426-1 through 426-m is connected both to vertical expander 422 and to vertical expander 424 by respective ports.

Note that the techniques introduced here are not limited to the use of dual-port SAS drives, or to dual-port storage devices of any kind. That is, the techniques may be practiced with drives having any number of ports. Thus, in an embodiment utilizing three-port storage devices, for example, each shelf would include three vertical expanders, rather than two vertical expanders as shown in shelf 420. Further, in an embodiment utilizing one-port storage devices (such as, in one embodiment, SATA drives), each storage device can be converted into, for example, a dual-port storage device utilizing a protocol bridge. Generally, various embodiments will use one vertical expander per shelf per storage device port.

Having thus described the detailed views of storage controller 410 depicted in FIG. 4a, and of shelf 420 depicted in FIG. 4b, discussion now returns to storage system 300 in FIG. 3. As stated above, in one embodiment storage controllers 310 and 311 correspond to storage controller 410 in FIG. 4a, and any of shelves 320-1 through 320-n corresponds to shelf 420 in FIG. 4b.

As discussed above, storage devices 326-1 through storage devices 326-n are each, in one embodiment, a group of drives 426-1 through 426-m, which can each be dual-ported SAS drives. Generally, dual-ported drives are two-way redundant, such that if one port fails, or if a path coupled to one port fails, the other port is able to continue operation. Notably, however, in the case of direct-attach storage devices (which SAS drives are), provisions for more than two-way redundancy are commercially infeasible, difficult, or impossible to make, because the drives are typically configured with only two ports each that are intended for direct connection via two paths to a storage controller.

According to the techniques introduced here, the connectivity of dual-ported SAS drives in storage devices 326-1 through 326-n is made more than two-way redundant by virtue of the communication fabric of storage system 300. For example, in one embodiment a dual-ported drive in storage devices 326-2 has up to four-way redundant connectivity through the communication fabric. In particular, a dual-ported drive in storage devices 326-2 has paths to storage controller 310 via vertical expander 322-1, vertical expander 324-1, vertical expander 322-n, and vertical expander 324-n. More generally, according to the present technique, a dual-ported drive in any of shelves 320-1 through 320-n has four paths to either of storage controller 310 or 311. This beneficial connective redundancy is not limited to two-port drives, or to four-way redundancy, but instead the techniques introduced here can be generally applied toward making the connectivity of any multiport drive more redundant than its number of ports would otherwise allow.

For example, more generally, the connectivity of a storage device (e.g., a storage device in storage device 326-1) having n ports, where n is an integer greater than one, that is configured to store data and to make data available to a storage controller (e.g., storage controller 310) via each of the n ports, is improved by a communication fabric configured to couple the storage controller to each of the n ports of the storage device via m paths, where m is an integer greater than n. The coupling is configured so that a storage system including the storage device and the storage controller is configured to tolerate failure in up to m−1 paths through the communication fabric, such that the data in the storage device remains accessible to the storage controller even in the presence of failure in up to m−1 paths of the m paths.

The connectivity described above is enabled, in part, by a routing configuration of storage system 300. The vertical expanders in shelves 320-1 through 320-n, like the vertical expanders 422 and 424 depicted in FIG. 4b are, in one embodiment, SAS expanders having a group of ports for connecting to SAS initiators, SAS targets, or another SAS expander. Further, horizontal expanders 330a through 330d are also, in one embodiment, SAS expanders. In such an embodiment, the shelf-to-shelf connections between vertical expanders, and the horizontal expander connections, can be "wide port" connections, i.e. connections utilizing four physical links. In contrast, the connections between a vertical expander and a particular SAS drive can be a regular connection utilizing one physical link. Wide ports provide higher communication bandwidth but typically utilize more physical links than regular connections.

An SAS expander routes frames between ports based on table routing or on subtractive routing. According to table routing, when an SAS expander receives a frame addressed for a particular destination, the SAS expander looks up the destination in a routing table to determine the port on which to forward the frame. According to subtractive routing, if the SAS expander cannot find the destination in the routing table, then the SAS expander forwards the frame on the subtractive port. As such, subtractive routing can be considered "default" routing. The routing table of an expander is populated with, for example, destination-port pairs. Populating the routing table includes storing a record (e.g., a destination-port pair) in a memory of the routing table. An illustrative routing table of horizontal expander 330a can include the records <storage controller 310, port 1>, <storage controller 311, port 2>, and <vertical expander 322-n, port 3>, for example, where each destination-port pair is indicated inside the characters < >. Particular sets of destination-port pairs help define paths through the communication fabric.

Shelves 320-1 through 320-n are, as stated previously, "daisy-chained" together. This means that vertical expanders 322-1 through 322-n are coupled together, and that vertical expanders 324-1 through 324-n are coupled together. As such, frames can be routed through paths going "up" and "down" vertical expanders 322-1 through 322-n. Notably, descriptions here of paths going "up" and "down" do not imply physical direction, but are merely used as guides for understanding the drawings. A frame can travel up from storage devices 326-2 through vertical expanders 322-2 and 322-1 to storage controller 310, or can travel down from storage devices 326-2 through vertical expanders 322-2 and 322-n to storage controller 310. Vertical expanders 322-1 through 322-n are configured, in one embodiment, for table routing in the upward routing direction, and subtractive routing in the downward routing direction.

For example, a frame traveling up from storage devices 326-2 through vertical expanders 322-2 and 322-1 to storage controller 310 can be table-routed at each vertical or horizontal expander. As such, in the upward direction, each vertical or horizontal expander should have a routing table populated with all possible upward destinations. For example, vertical expander 322-2 should have table routing entries for storage controllers 310 and 311 indicating that a frame addressed to either should be forwarded to vertical expander 322-1.

As another example, a frame traveling down from storage devices 326-2 through vertical expanders 322-2 and 322-n to storage controller 310 can be subtractive-routed at each vertical expander. As such, in the downward direction, each vertical expander is coupled via its subtractive port to the subsequent vertical expander. For example, vertical expander 322-2 has a subtractive port coupled to intervening vertical expanders, one of which has a subtractive port coupled to vertical expander 322-n, which itself has a subtractive port coupled to horizontal expander 330a.

In one embodiment, in the upward and downward examples above, horizontal expanders 330a, 330b, 330c, and 330d in both cases are configured for only table routing, and not for subtractive routing. As such, when forwarding frames in either direction (i.e., to storage controller 310 or 311 or to vertical expander 322-1, 324-1, 322-n, or 324-n), horizontal expanders 330a, 330b, 330c, and 330d each have a routing table populated with all possible destinations. To prevent unworkability of routing, zones can be implemented in the horizontal expanders to enforce isolation, as discussed below.

Figure 5A:
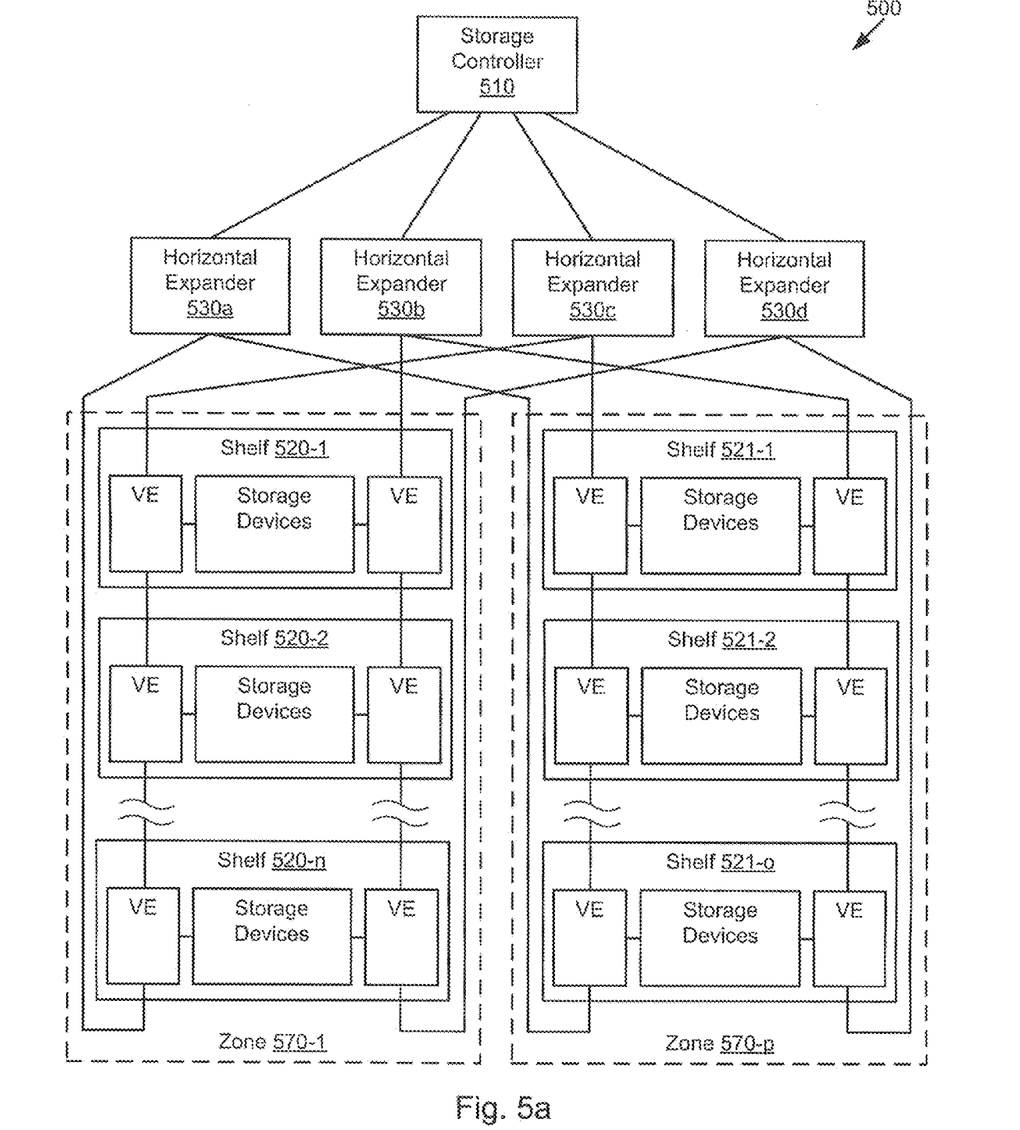
FIG. 5a is a block diagram of a storage system including a storage controller and several storage subsystems in separate zones.

FIG. 5a is a block diagram of storage system 500 in which the techniques introduced here, including zoning techniques, are implemented. Storage system 500 may correspond, in one embodiment, to storage system 200 depicted in FIG. 2. Storage system 500 includes storage controller 510, which corresponds in one embodiment to storage controller 410 in FIG. 4a. Note that in one embodiment, storage system 500 can include a second storage controller (not shown), in the manner of storage controller 311 depicted in FIG. 3. Further, in another embodiment storage system 500 can include three or more storage controllers (not shown). Storage system 500 also includes two groups of shelves 520 and 521. Each shelf substantially corresponds to shelf 420 in FIG. 4b, and each group of shelves corresponds, in one embodiment, to shelves 320-1 through 320-n in FIG. 3. However, in some embodiments the number, n, of shelves 520 is different than the number, o, of shelves 521. The groups of shelves 520 and 521 are also referred to as "stacks" of shelves, or as "storage subsystems." Storage system 500 also includes horizontal expanders 530a, 530b, 530c, and 530d that are coupled between storage controller 510 and the two groups of shelves 520 and 521 as depicted in FIG. 5a.

In storage system 500, upward and downward routing in shelves 520-1 through 520-n and shelves 521-1 through 521-o works in a manner corresponding to that discussed above with respect to shelves 320-1 through 320-n. Further, routing within horizontal expanders 530a, 530b, 530c, and 530d works in a manner corresponding to that discussed above with respect to horizontal expanders 330a, 330b, 330c, and 330d.

Zones 570 are implemented in storage system 500 by grouping shelves 520 in zone 570-1 and by grouping shelves 521 in zone 570-p. Shelves 520 are grouped into zone 570-1 by assigning the vertical expanders (shown in FIG. 5a by the acronym "VE") of each shelf a common zone identifier, such as an integer. The vertical expanders of shelves 521 are assigned a different common zone identifier, such as a different integer. By implementing zones in this fashion, populating the routing tables of the vertical expanders in shelves 520 with destinations in shelves 521 is avoided. Likewise, populating the routing tables of the vertical expanders in shelves 521 with destinations in shelves 520 is avoided. Instead, routing tables of vertical expanders in a given zone are limited to storing destinations in that zone. This is the case in one embodiment because zoning limits the extent of routing and discovery. Also, routing tables of vertical expanders in a given zone can also include, in some embodiments, destinations at storage controllers, such as a data fabric interface (e.g., data fabric interface 450) of a storage controller. As such, in one embodiment zone 570-1 includes a data fabric interface of storage controller 510, as well as shelves 520.

The routing tables of vertical expanders in a given zone are not required to store destinations in other zones. By virtue of this technique, the number of destinations that are preferably stored in the vertical expanders is kept small. If this technique were not utilized, then in some cases the number of destinations required to be stored in each routing table might exceed the maximum amount storable because of, for example, routing table physical memory constraints. In these cases, routing becomes unworkable, and a storage system will not function.

In addition to the above, in one embodiment zones can also implemented by assigning particular ports of horizontal expanders 530a, 530b, 530c, and 530d to zones. For example, the two ports of horizontal expander 530a coupled to vertical expanders in zones 570-1 and 570-p are assigned to those respective zones. By assigning horizontal expander ports in this manner, the vertical expanders in the top and bottom shelves of each stack can "see," and thus route to, the horizontal expanders, to route frames out of each stack to storage controller 510.

Zoning limits the extent of routing and discovery. Routing downward from a data fabric interface to a storage device is substantially unrestricted, because each data fabric interface can reach any storage device. Routing upward from a storage device to a data fabric interface is unrestricted because each storage device can reach any data fabric interface. However, routing "sideways," from one storage device to another storage device, is restricted because no storage device can reach a storage device in another zone.

By implementing zones as discussed above, storage system 500 can be implemented with many more stacks than would otherwise be the case, because each stack is limited to routing within only its particular zone, and thus is not required to store destinations outside of its particular zone. Notably, therefore, implementations utilizing the present techniques can be created with more stacks than are depicted in FIG. 5a. Further, implementations utilizing the present techniques can be created with more storage controllers than are depicted in FIG. 5a.

Figure 5B:
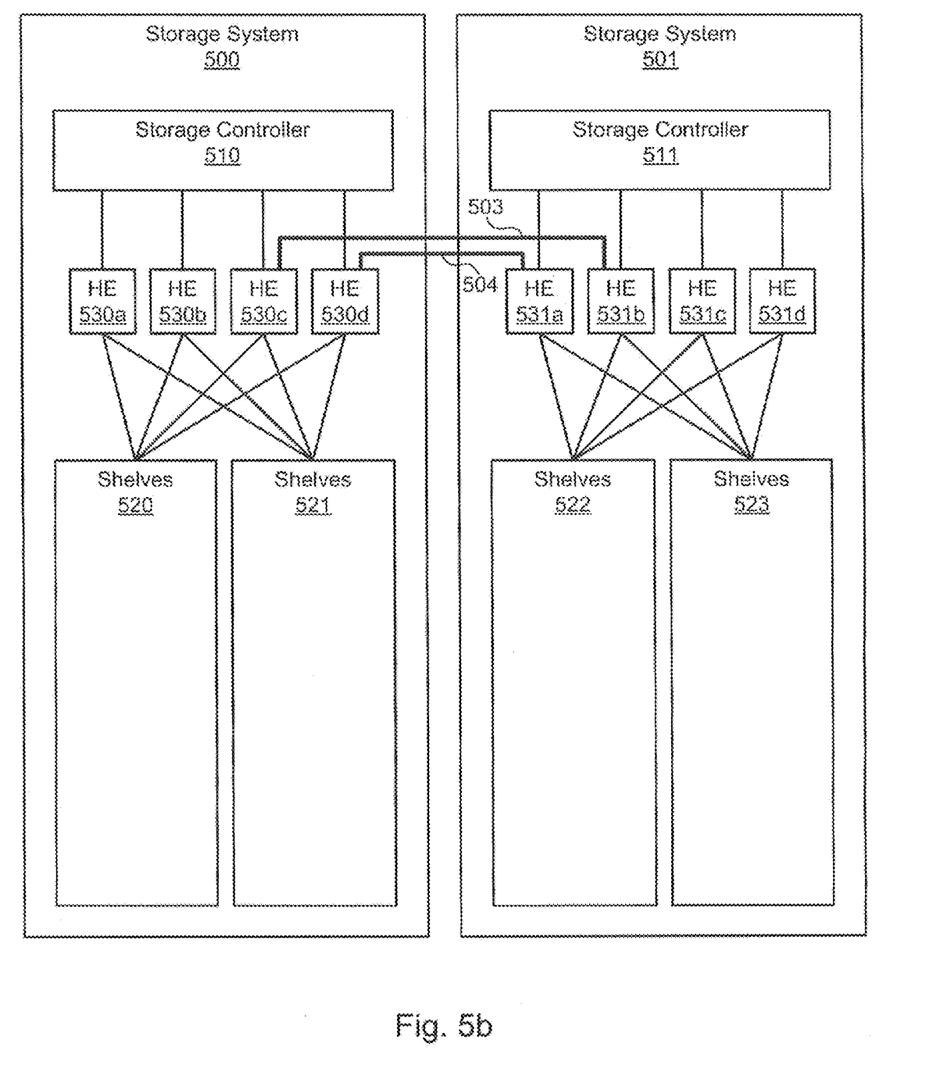
FIG. 5b is a block diagram of two storage systems configured to share storage subsystems.

FIG. 5b is a block diagram of storage system 500 and storage system 501 in which the techniques introduced here are implemented. Storage system 500 depicted in FIG. 5b corresponds to storage system 500 depicted in FIG. 5a. Storage system 501 is a physical duplicate of storage system 500, as depicted in FIG. 5b, but storage system 500 is not required to be an exact physical duplicate. As such, the techniques introduced here can be implemented with pairs (or larger groups) of storage systems that are not identical.

Storage system 500 includes storage controller 510, two groups of shelves 520 and 521, and horizontal expanders 530a, 530b, 530c, and 530d that are coupled between storage controller 510 and the two groups of shelves 520 and 521. Note that in other embodiments, storage system 500 can include additional storage controllers, horizontal expanders, and shelves. Also note that the depiction of connections between horizontal expanders and shelves has been simplified in FIG. 5b for clarity. Despite the simplified depiction, it will be understood that horizontal expanders 530a, 530b, 530c, and 530d are connected to the vertical expanders within shelves 520 and 521 in the manner depicted in FIG. 5a.

In like fashion, storage system 501 includes storage controller 511, two groups of shelves 522 and 523, and horizontal expanders 531a, 531b, 531c, and 531d that are coupled between storage controller 511 and the two groups of shelves 522 and 523. As is the case with storage system 500, in other embodiments storage system 501 can include additional storage controllers, horizontal expanders, and shelves. It will be understood that horizontal expanders 531a, 531b, 531c, and 531d are connected to the vertical expanders within shelves 522 and 523 in a manner like that of storage system 500.

As depicted in FIG. 5b, storage systems 500 and 501 are coupled by coupling 503 and coupling 504. In particular, horizontal expander 531b is coupled to horizontal expander 530c by coupling 503, and horizontal expander 531a is coupled to horizontal expander 530d by coupling 504. Couplings 503 and 504 are, for example, physical cable links. Couplings 503 and 504 allow sharing of communication fabrics between storage systems 500 and 501. For example, via couplings 503 and 504, storage controller 510 can access storage devices in shelves 522 and 523, and storage controller 511 can access storage devices in shelves 520 and 521.

A method for coupling storage systems 500 and 501 in the manner of FIG. 5b includes adding couplings 503 and 504 in the manner shown. No changes to the existing cabling within storage systems 500 and 501 are necessary. This is beneficial, because such changes can be error-prone and a liability if performed incorrectly on a live storage system.

Certain topology rules are preferably followed to couple storage systems 500 and 501 in the manner of FIG. 5b. For example, no "loops" should be formed. One example of a loop is two different paths from any expander port that enter the same domain. Such loops are illegal according to SAS topology rules because there would be two paths for a host port connected to a horizontal expander to get to a disk within a shelf. To avoid this problem, in one embodiment software executing in a storage system is configured to detect loops and other illegal couplings and to disable an offending "redundant" coupling while at the same time alerting users that an illegal topology has been formed. This detection and disablement capability helps allow the joining of fabrics as depicted in FIG. 5b.

In a variation on the embodiment depicted in FIG. 5b, observance of the topology rules can be relaxed. In particular, if storage system 501 is modified so that it includes storage controller 511 and horizontal expanders 531a, 531b, 531c, and 531d, but does not also include shelves 522 and 523, then illegal topologies can not be formed when joining the modified storage system 501 to storage system 500. As such, joining a "shelfless" storage system (e.g., the modified storage system 501) to another storage system that includes shelves can incur less topological risk.

Figure 6:
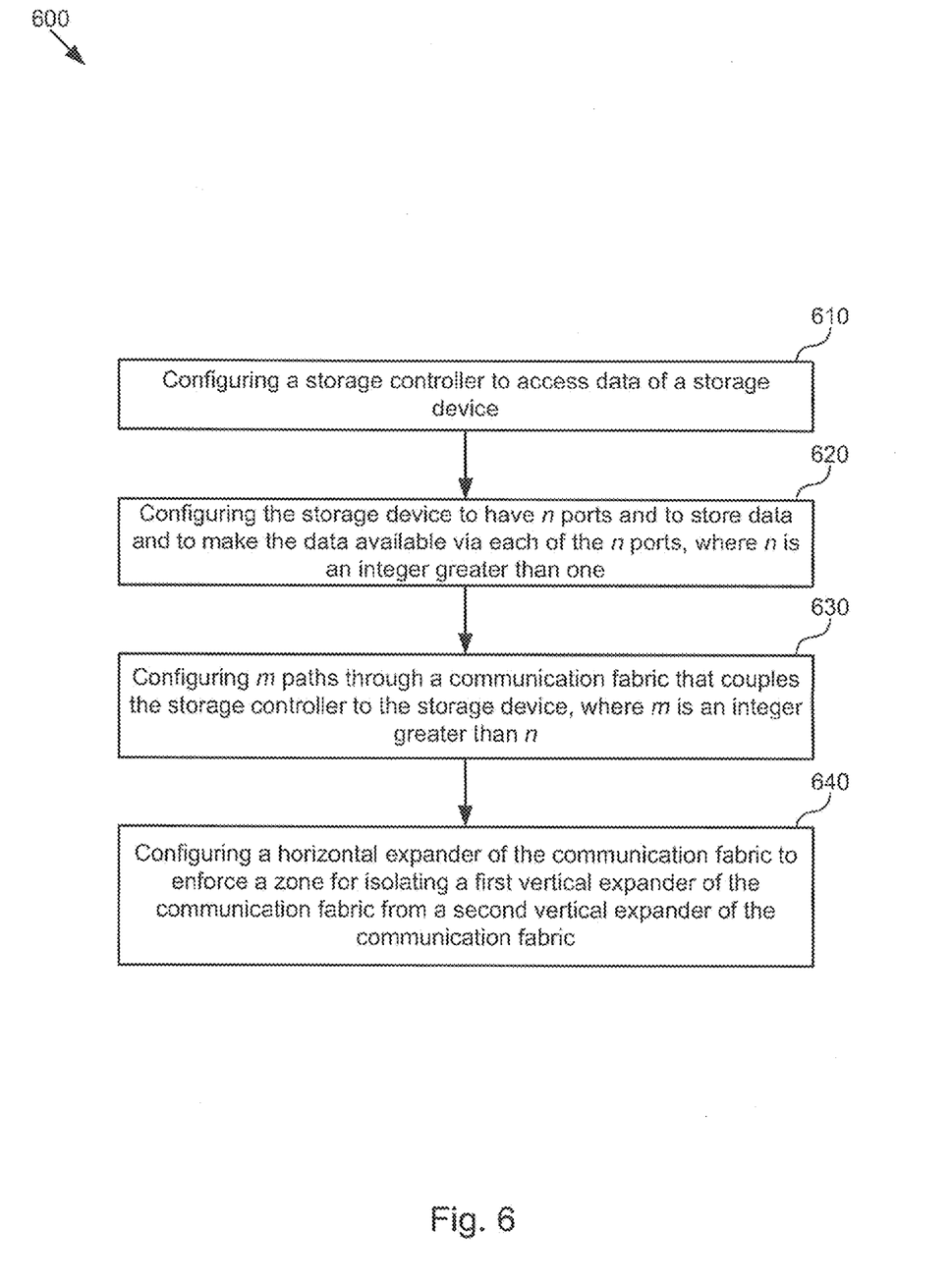
FIG. 6 illustrates a process for configuring paths through and enforcing zones in a communication fabric according to one embodiment.

FIG. 6 depicts process 600, including steps 610 through 640, for configuring paths through and enforcing zones in a communication fabric according to the techniques introduced here. Step 610 includes configuring a storage controller to access data of a storage device. For example, this configuring includes initializing the storage controller (e.g., storage controller 410 in FIG. 4a) into a state ready for communication with a communication fabric, such as that discussed above with respect to FIG. 3. Step 620 includes configuring the storage device to have n ports and to store data and to make the data available via each of the n ports, where n is an integer greater than one. For example, such configuring includes initializing the storage device (e.g., storage device 426-1 in FIG. 4b, having two ports) into a state ready for communication with the communication fabric.

Step 630 includes configuring m paths through a communication fabric that couples the storage controller to the storage device, where m is an integer greater than n. Configuring each of the m paths includes, for example, populating routing tables in horizontal and vertical expanders along the path in the communication fabric with destination-port pairs. Such routing tables correspond, in one embodiment, to the routing tables discussed above in relation to storage system 300 of FIG. 3. Process 600 continues in step 640, which includes configuring a horizontal expander of the communication fabric to enforce a zone for isolating a first vertical expander of the communication fabric from a second vertical expander of the communication fabric. The horizontal expander can be, in one embodiment, horizontal expander 530a in FIG. 5a, while the first and second vertical expanders can be vertical expanders in shelves 520-1 and 521-1, respectively. The zone can be, for example, zone 570-1 or zone 570-p. Configuring the horizontal expander includes, for example, associating a port of the horizontal expander with a zone identifier. Enforcing a zone for isolating the first vertical expander includes, for example, grouping the horizontal expander into a zone identifier.

Figure 7:
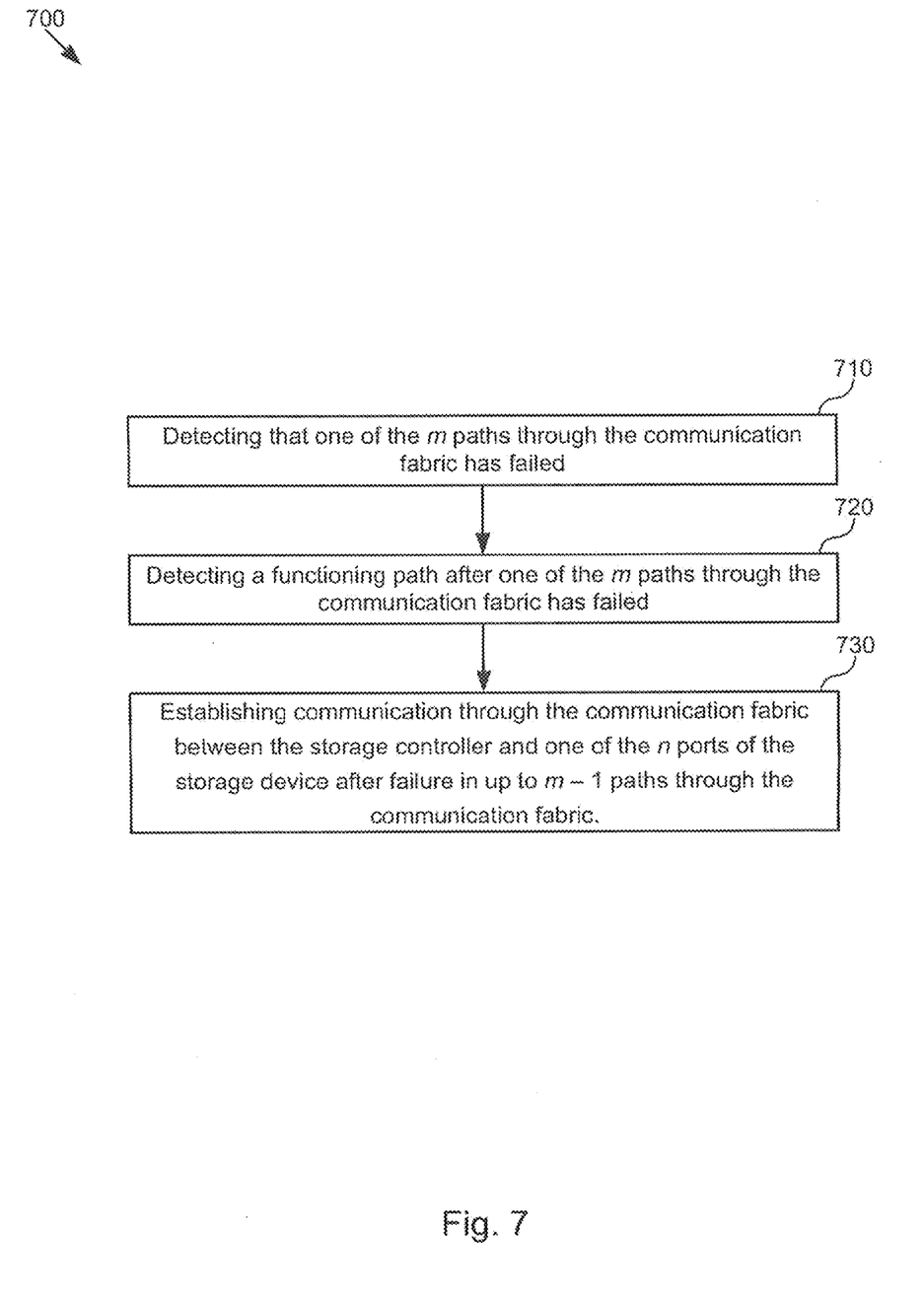
FIG. 7 illustrates a process for handling failure in a communication fabric according to one embodiment.

FIG. 7 depicts process 700, including steps 710 through 730, for handling failure in a communication fabric according to the techniques introduced here. Step 710 includes detecting that one of the m paths through the communication fabric has failed, and step 720 includes detecting a functioning path after one of the m paths through the communication fabric has failed. Detecting that a path has failed can include, for example, detecting that a frame has failed to be transmitted between two vertical expanders. The detection can occur at, for example, the vertical expander that attempted to transmit the frame but could not establish a connection to the receiving vertical expander. Alternatively, the detection can occur at, for example, the storage controller that was ultimately expecting to receive the transmitted frame. Detecting a functioning path can include, for example, selecting a different port in a routing table in a vertical expander.

Process 700 concludes in step 730, which includes establishing communication through the communication fabric between the storage controller and one of the n ports of the storage device after failure in up to m−1 paths through the communication fabric. The storage controller and n-port storage device referred to correspond, in one embodiment, to the storage controller and storage device of process 600. This establishing communication occurs after, for example, an additional failure of the type described in steps 710 and 720. Thus, if n equals two in a particular embodiment, then according to the present techniques at least two failures of the type described in steps 710 and 720 can occur without impeding the establishment of communication in step 730. Notably, establishing communication after failure in up to m−1 paths provides redundancy in excess of that ordinarily available from an n-port storage device.

The foregoing description has been directed to specific embodiments of this invention. It will be apparent, however, that other variations and modifications may be made to the described embodiments, with the attainment of some or all of their advantages. For instance, it is expressly contemplated that these techniques can be implemented as software, including a computer-readable medium having program instructions executing on a computer, hardware, firmware, or a combination thereof. Furthermore, it should be noted that while portions of this description have been written in terms of a storage system utilizing SAS hardware and software, the teachings of the technique introduced here are not so limited. The technique introduced here can be utilized with any kind of direct-attach storage. Accordingly this description is to be taken only by way of example and not to otherwise limit the scope of the invention. Therefore, it is the object of the claims to cover all such variations and modifications as come within the true spirit and scope of the invention.

What is claimed is:

1. A storage system comprising:
a storage controller configured to access data stored in a storage subsystem; the storage subsystem including a storage device having n ports, wherein n is an integer greater than one, and wherein the storage device is configured to store the data and to make the data available to the storage controller via each of the n ports; and
a communication fabric configured to couple the storage controller to each of the n ports of the storage device via m paths, wherein m is an integer greater than n, so that the storage system is configured to tolerate failure in up to m−1 paths through the communication fabric, such that the data in the storage device remains accessible to the storage controller even in the presence of failure in up to m−1 paths of the m paths, and wherein the communication fabric includes:
a horizontal expander coupling the storage controller to the storage subsystem,
a first vertical expander of the storage subsystem coupling the horizontal expander to the storage device, wherein the first vertical expander couples a plurality of links in the communication fabric to one of the n ports of the storage device, and
a second vertical expander, wherein the horizontal expander is configured to enforce a zone for isolating the first vertical expander from the second vertical expander of the storage system.

2. The storage system of claim 1, wherein the storage device is a direct-attach storage device.

3. The storage system of claim 1, wherein the storage subsystem includes a plurality of storage devices, each having n ports, including the storage device, wherein the communication fabric is configured to couple the storage controller to each of the n ports of each of the plurality of storage devices via the m paths, so that the storage system is configured to tolerate failure in up to m−1 paths through the communication fabric, so that the data in one of the plurality of storage devices remains accessible to the storage controller even in the presence of failure in up to m−1 paths of the m paths.

4. The storage system of claim 1, further comprising a plurality of storage controllers, wherein each of the plurality of storage controllers is configured to access the data of the storage device, and wherein the communication fabric is further configured to couple the plurality of storage controllers to each of the n ports of the storage device via the m paths.

5. The storage system of claim 1, further comprising a plurality of storage controllers including the storage controller, and wherein the storage subsystem includes a plurality of storage devices, each having n ports, including the storage device, and further wherein each of the plurality of storage controllers is configured to access the data of each of the plurality of storage devices, and wherein the communication fabric is further configured to couple the plurality of storage controllers to the ports of the plurality of storage devices via the m paths, so that the storage system is configured to tolerate failure in up to m−1 paths through the communication fabric, so that the data in one of the plurality of storage devices remains accessible to the plurality of storage controllers even in the presence of failure in up to m−1 paths of the m paths.

6. A storage system comprising:
a plurality of storage controllers configured to access data;
a storage subsystem including a plurality of storage devices each having n ports, wherein n is an integer greater than one, and wherein the plurality of storage devices is configured to store data and to make the data available to the plurality of storage controllers via the ports;

a plurality of horizontal expanders configured to couple the plurality of storage controllers to the storage subsystem;

a plurality of vertical expanders of the storage subsystem configured to couple the plurality of horizontal expanders to the plurality of storage devices; wherein the plurality of horizontal expanders is configured to enforce a zone for isolating the plurality of vertical expanders from another storage subsystem of the storage system; and a communication fabric configured to couple the plurality of storage controller to the ports of the plurality of storage devices via m paths through the plurality of horizontal expanders and the plurality of vertical expanders, wherein m is an integer greater than n, and wherein the m paths pass through more than n of the plurality of horizontal expanders, so that the storage system is configured to tolerate failure in up to m−1 paths through the communication fabric, such that the data in one of the plurality of storage devices remains accessible to the plurality of storage controllers even in the presence of failure in up to m−1 paths of the m paths.

7. A method comprising:

configuring m paths through a communication fabric that couples a storage controller to a storage device, wherein the storage controller is configured to access data of the storage device, and wherein the storage device has n ports and is configured to store the data and to make the data available via each of the n ports, and wherein m is an integer greater than n, and n is an integer greater than one;

establishing communication through the communication fabric between the storage controller and one of the n ports of the storage device after failure in up to m−1 paths through the communication fabric, wherein the communication fabric includes a horizontal expander coupling the storage controller to the storage subsystem, and wherein the communication fabric includes a first vertical expander of the storage subsystem coupling the horizontal expander to the storage device; and configuring the horizontal expander to enforce a zone for isolating the first vertical expander from a second vertical expander of the communication fabric.

8. The method of claim 7, wherein the storage device is a direct-attach storage device.

9. The method of claim 7, wherein the configuring the m paths includes storing a record of one of the m paths in the horizontal expander.

10. The method of claim 7, wherein the configuring the m paths includes storing a record of one of the m paths in the vertical expander.

11. The method of claim 7, further comprising detecting that one of the m paths through the communication fabric has failed and, detecting a functioning path.

12. A method comprising:

configuring m paths through a communication fabric that couples a plurality of storage controllers to a plurality of storage devices via a plurality of horizontal expanders and a plurality of vertical expanders, wherein the plurality of storage controllers is configured to access data of the plurality of storage devices, and wherein each of the plurality of storage devices has n ports and is configured to store the data and to make the data available via the ports, and wherein m is an integer greater than n, and n is an integer greater than one;

configuring the plurality of horizontal expanders to enforce a zone for isolating a first vertical expander of the plurality of vertical expanders from a second vertical expander of the plurality of vertical expanders; and establishing communication through the communication fabric between the plurality of storage controllers and one of the n ports of one of the plurality of the storage devices after failure in up to m−1 paths through the communication fabric.

13. The method of claim 12, wherein one of the plurality of storage devices is a direct-attach storage device.

14. The method of claim 12, wherein the plurality of vertical expanders couple a plurality of links in the communication fabric to the n ports of one of the plurality of storage devices.

* * * * *